INVENTORS
H. G. A. Newman
C. T. Hammond
BY
ATTORNEYS

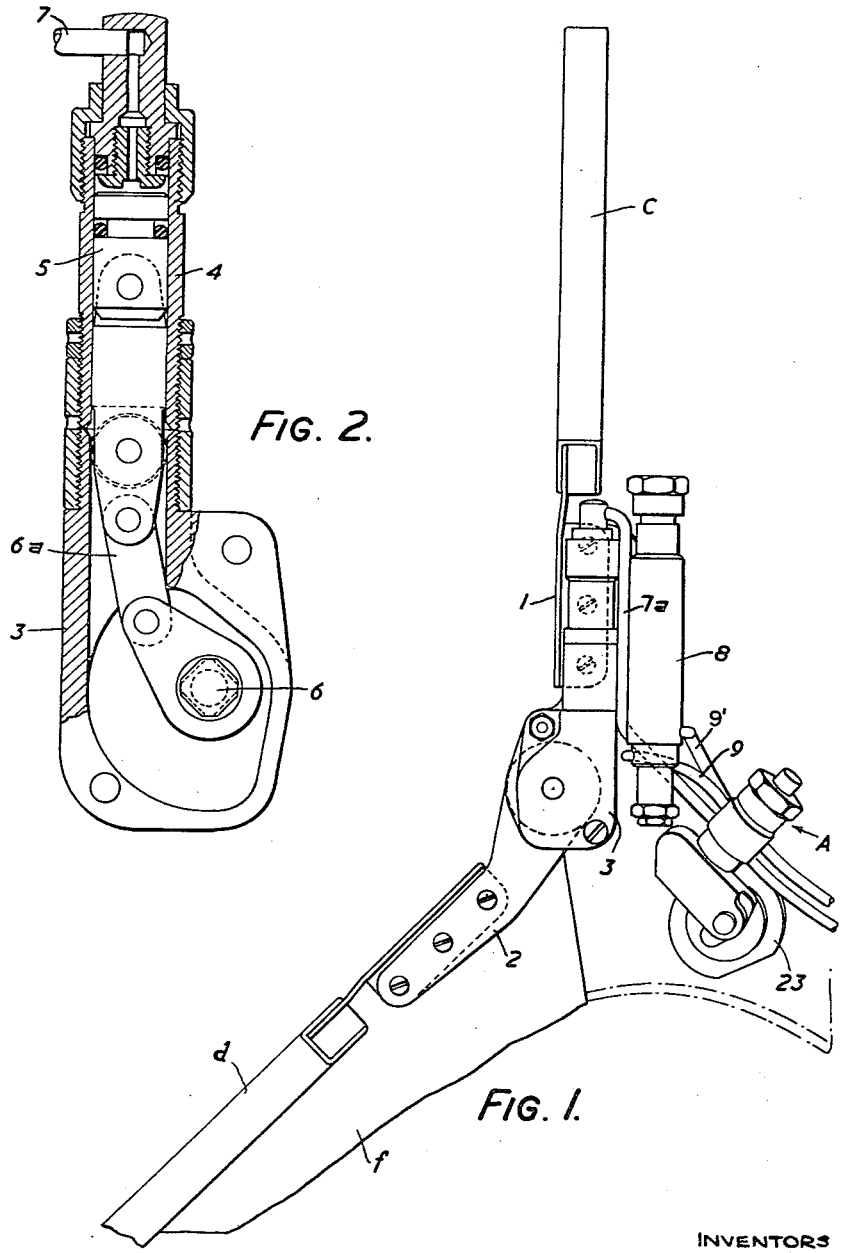

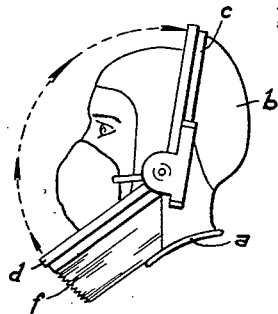
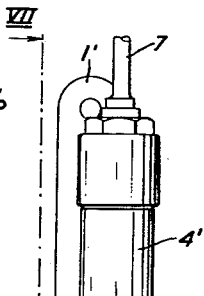
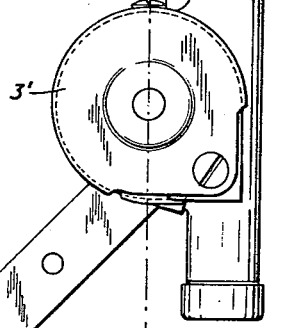
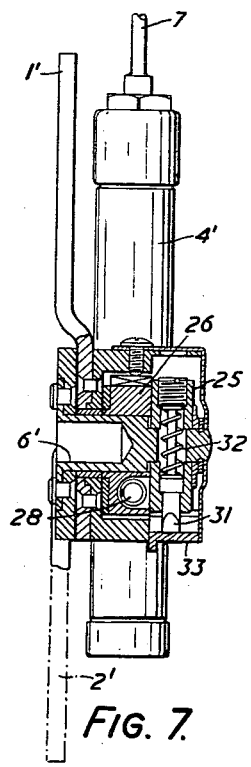
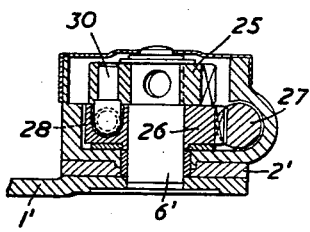
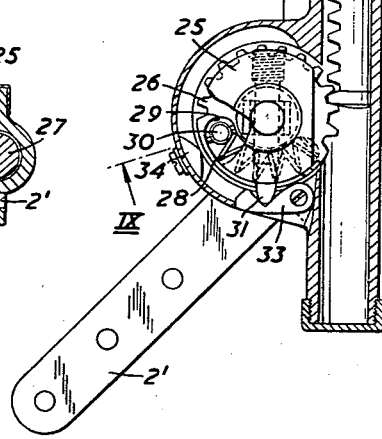

INVENTORS
H. G. A. Newman
C. T. Hammond
BY
ATTORNEYS

Aug. 28, 1962

H. G. A. NEWMAN ETAL  3,050,735
APPARATUS FOR AUTOMATICALLY PIVOTING A HINGED
CLOSURE INTO CLOSED POSITION

Filed March 24, 1959

INVENTORS
H.G.A. Newman
C.T. Hammond
BY
Holcomb, Wetherill & Brisbois
ATTORNEYS

United States Patent Office 3,050,735
Patented Aug. 28, 1962

3,050,735
APPARATUS FOR AUTOMATICALLY PIVOTING A HINGED CLOSURE INTO CLOSED POSITION
Herbert George Albert Newman, Tolworth, and Charles Thomas Hammond, Norbury, London, England, assignors to Redwing Limited, Surrey, England, a British company
Filed Mar. 24, 1959, Ser. No. 801,586
Claims priority, application Great Britain Mar. 28, 1958
9 Claims. (Cl. 2—6)

This invention relates to apparatus for automatically pivoting a hinged closure into closed position. The invention is particularly applicable to the automatic closing of the hinged vizor of an airman's high altitude helmet in the event of atmospheric decompression in the aircraft cockpit or cabin.

In high altitude flying the aircraft has to be pressurised and the airman normally wears a pressured suit having a helmet provided with a face piece mounted on a hinged frame. During normal flight the airman normally prefers to have the face piece open but if the cockpit should be de-compressed, for example due to the cockpit being damaged or the cover accidentally coming adrift, it is imperative that the face piece be closed immediately as the airman could not live under conditions of high de-compression. As the effects of a sudden de-compression could produce unconsciousness or loss of control, it is not advisable to leave the closing of the face piece of the helmet to be effected by the airman himself as a delay might result which would be fatal.

It is accordingly an object of the invention to provide apparatus whereby the closure is automatically and rapidly effected.

According to the present invention apparatus for automatically pivoting a hinged closure into closed position on a predetermined fall in pressure of the surrounding atmosphere, comprises mechanism connected with the closure for effecting said pivoting movement, a receptacle containing fluid under pressure for operating said mechanism and a device operable on said predetermined fall in pressure to permit the fluid under pressure in the receptacle to flow therefrom and operate said mechanism.

To enable the invention to be fully understood it will now be described with reference to the accompanying drawings in which:

FIG. 1 is a side view of part of an airman's high altitude flying helmet,

FIG. 2 is sectional side elevation of mechanism for pivoting the hinged vizor of the helmet into closed position.

Figures 10, 12:
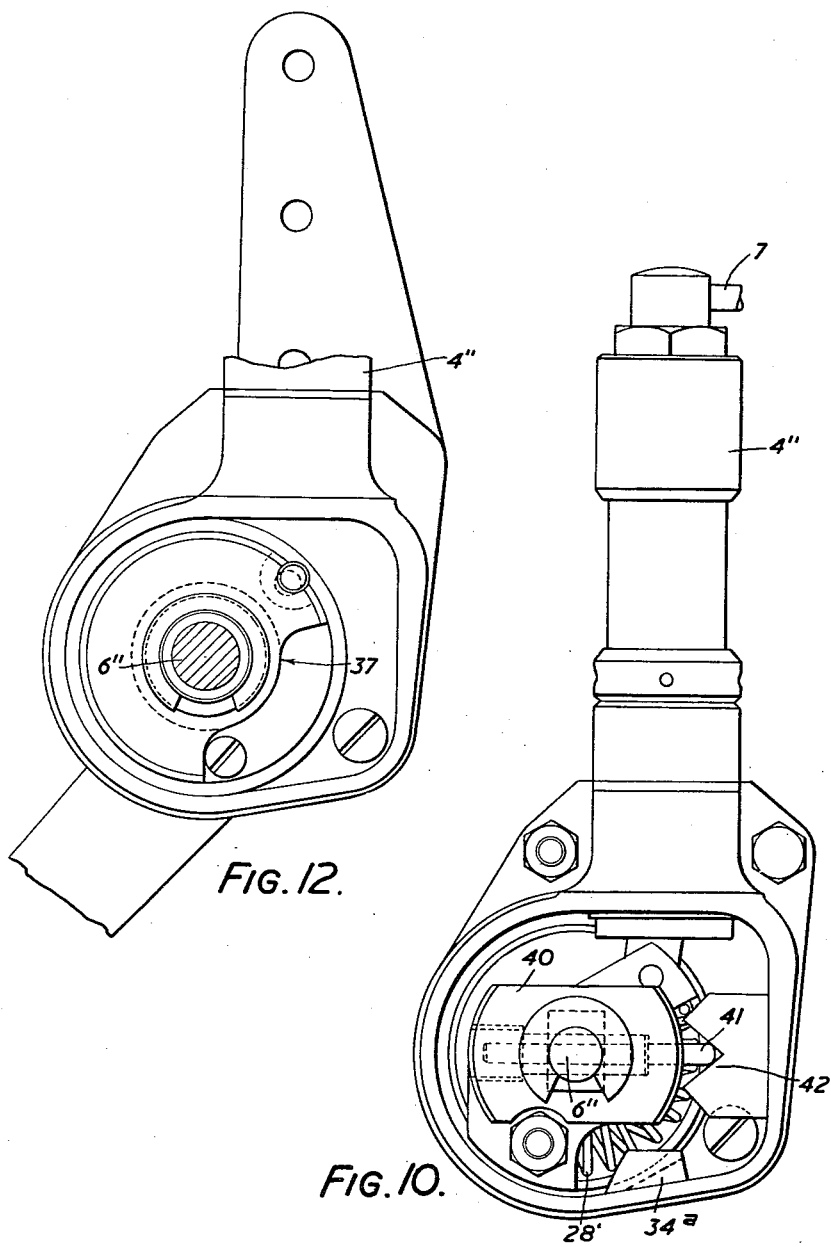
Figure 11:
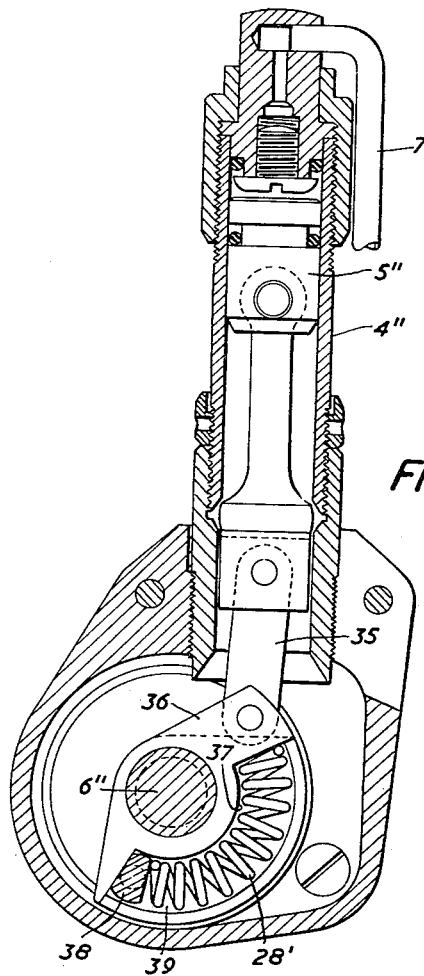
Figure 13:
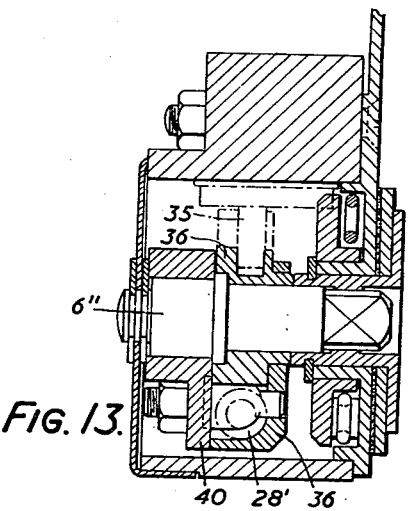

FIG. 5 is a diagrammatic view of an airman's helmet and operating mechanism according to a modified form of the invention, FIG. 6 is a side view, on an enlarged scale of the operating mechanism shown in FIG. 5, FIG. 7 is a section on line VII—VII of FIG. 6, FIG. 8 is a sectional side view of the mechanism according to FIGS. 6 and 7, FIG. 9 is a fragmentary section on line IX—IX of FIG. 8, FIG. 10 is a part sectional side view of a further modified form of mechanism for operating the vizor, FIG. 11 is a sectional view of the mechanism shown in FIG. 10 with parts removed, FIG. 12 is a view partly in section of the mechanism shown in FIGS. 10 and 11 with parts removed, and FIG. 13 is a fragmentary section of the mechanism shown in FIGS. 10–12.

As shown in FIG. 5 of the accompanying drawing an airman's high altitude flying helmet includes a neck portion $a$ adapted to be attached to a pressurised suit and a head portion $b$ having an open front provided with a rigid frame $c$. The open front is adapted to be closed by a hinged vizor comprising a pivotally mounted frame $d$ having a flexible transparent face piece $f$ such that when the vizor is in closed position, the face piece extends over the open front and forms an air tight transparent cover for the front of the helmet, the vizor preferably being automatically latched when in closed or raised position.

Under normal flying conditions when the cockpit or cabin of the aircraft will be pressurised, an airman usually prefers to have the vizor of his helmet in its lowered position as indicated in FIG. 5. If however, the cockpit or cabin should be suddenly subject to atmospheric decompression at high altitude, for example due to damage of the wall structure or cockpit cover, it is imperative that the vizor be closed immediately as if the face of the airman remains exposed to the very low pressure at high altitudes harmful and possible fatal consequences will result.

The sudden fall in pressure could result in unconsciousness or loss of control and therefore, it is important that the closing of the vizor be effected rapidly and automatically without any action being required on the part of the airman.

The present invention provides fluid pressure operated mechanism for automatically closing the vizor and as shown in FIGS. 1 to 5, operating mechanism for pivoting the vizor into closed position is mounted on an arm 1 which is secured to the fixed frame $c$ of the helmet. A second arm 2 is hinged to the arm 1 and connected to the frame $d$ of the vizor. The mechanism includes a casing 3 rigidly connected to the arm 1 and formed with a cylindrical extension 4 housing a piston 5.

The arm 2 is keyed to a hinge pin 6 which is connected by a pivoted link 6$a$ to the piston 5, such that downward movement of the piston will rotate the hinge pin so as to hinge the frame $d$ upwardly and raise the vizor into closed position.

The piston is operated by fluid pressure supplied by a pipe 7 communicating with a valve unit A. The fluid under pressure is contained in a receptacle 8 having a pipe 9 leading to the valve unit.

As shown the valve unit includes a casing 10 housing a valve body 11 having an axial passage 12 in communication with an annular passage 13 which registers with the supply pipe 9.

The lower end of the axial passage is sealed by a frangible diaphragm 14 the peripheral edge of which is clamped between a washer 15 and the end wall of the casing 10. As the fluid under pressure flowing from the receptacle 8 into the axial passage 12 via the pipe 9 would be capable of bursting the diaphragm which is made, for example of a sheet of thin metal, its outer face is supported by the rod like end 16 of a plunger 17.

Figure 3:
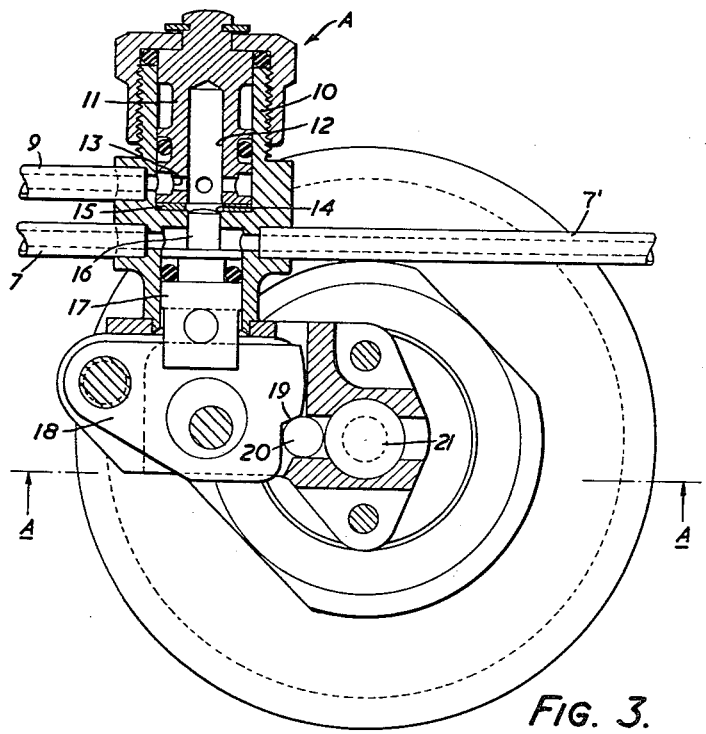
FIG. 3 is a part sectional view of a valve unit for controlling the supply of fluid pressure for operating the mechanism.
Figure 4:
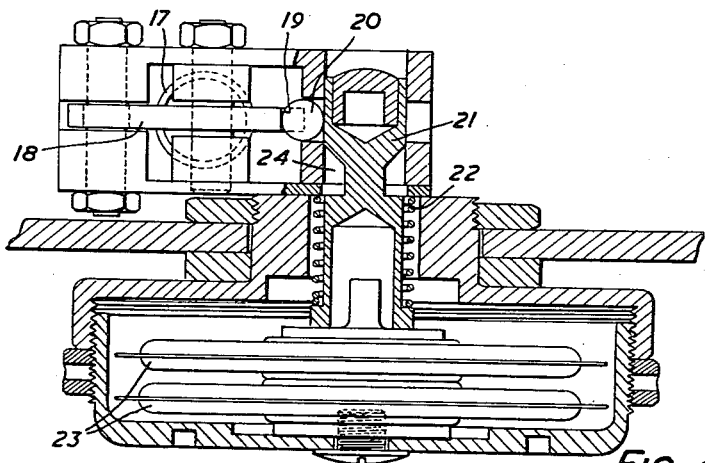
FIG. 4 is a section on line A—A of FIG. 3.

The plunger 17 is held in supporting position by a pivoted lever 18 having a shoulder 19 engaging a ball 20 which is restrained against outward movement by abutment with a slidable plunger 21 which is urged into the position shown in FIGS. 3 and 4 by a spring 22.

The plunger 21 is connected with a pressure responsive device comprising a pair of barometric capsules 23, which are so designed that under the pressure conditions normally prevailing in the aircraft cockpit or cabin, the capsules and the plunger 21 will be in the position indicated in FIGS. 3 and 4. If, however, the cockpit or cabin becomes decompressed the resultant drop in atmospheric pressure will cause the capsules to expand and push the plunger 21 outwardly to align an annular recess 24 with the ball 20. The leverage exerted by the shoulder 19 on the ball will cause the latter to be displaced into the recess 24 freeing the lever 18. The latter being no longer supported, the pressure in the axial passage 12 will act on the diaphragm 14 and flex it so as to move the rod like end 16 away from its supporting relation and the diaphragm will then be ruptured by the pressure of the fluid.

The fluid under pressure can now escape through the outlet of the valve casing and flow into the pipe 7 to the upper end of the cylinder 4 to force the piston 5 downwardly.

When the piston is moved downwardly it rotates the hinge pin 6 and with it the hinged frame member $d$ so that the vizor is moved into closed position and automatically latched by suitable means (not shown).

The pressure of the fluid will be such as to effect a rapid closing movement of the vizor and accordingly it will be noted that the pressure responsive means 23 will control the supply of fluid pressure to close the vizor immediately there is a dangerous fall in the atmospheric pressure in the cockpit or cabin of the aircraft.

The frame member $d$ will be of bow shape and each end will be hinged to the fixed frame. Operating mechanism including a cylinder and piston unit as described above will be connected with both the hinge pins and receptacles containing fluid under pressure provided for operating the mechanisms, the receptacles being connected with a pipe 9' for ensuring that the pressures in the receptacles are equalized.

Only one value unit A is provided and the pipes 7, 7' carry the fluid pressure to the respective cylinders 4 when the diaphragm is ruptured.

With reference to the modification illustrated in FIGS. 5 to 8 the fixed arm 1' carries a casing 3' having a cylindrical extension 4' housing a piston 5'.

A hinge pin 6' is rigidly connected with the arm 2' and extends through an aperture in the arm 1' into the casing 3'. A driving disc 25 is keyed to the hinge pin 6' and a pinion 26 is rotatably mounted on the hinge pin, the teeth of the pinion meshing with a rack 27 depending from the piston 5'.

The driving disc 25 and the pinion 26 are resiliently coupled by a spring 28 housed in a circumferentially extending slot 29 in the pinion 26, one end of the spring engaging a lateral stud 30 on the driving disc 25.

The disc 25 is also provided with a radially extending pin 31 which is resiliently urged outwardly by a spring 32.

When the apparatus is in the "at rest" position shown in FIGS. 5 to 9 the pin 31 engages in a notch in a pivoted latch 33 which is held in its pin engaging position by a projection on the pinion 26 engaging the toe of the latch 33.

The mechanism is adapted to be actuated by fluid under pressure supplied through the pipe 7 to the cylinder 4' under the control of the valve unit A and pressure responsive means described in connection with first embodiment of the invention.

When fluid under pressure is supplied to the cylinder 4', the piston 5' is forced downwardly and the rack 27 rotates the pinion 26 and as the latter is freely rotatable on the hinge pin 6' the spring 28 will be compressed. When the rotation of the pinion 26 frees latch 33 by disengaging the projection on the pinion from the toe of the latch, the driving disc 25 will be rotated to rotate the arm 2' to raise the vizor into closed position.

At the instant of effecting the closure of the vizor the airman may have his head positioned forwardly so that part of his face or his equipment, such as an oxygen mask may be in the path of the vizor. In such cases therefore, it may be desirable to give the airman some indication that the vizor is being closed to warn him to withdraw his head.

For this purpose a cam shaped abutment 34 is provided on the inner wall of the casing 3'. As the driving disc 25 is rotated to raise the vizor, the pin 31 will strike the abutment when the vizor has been raised, for example ¼ or ⅕ of its total movement, into closed position.

The compression characteristics of the spring 28 are such that if the only load on the disc 25 is that imposed in raising the vizor, the spring will be only lightly compressed in the transmission of the drive from the pinion 26 to the disc. If however, an additional load is imposed, for example, a resistance to the free rotation of the disc, the spring will be further compressed and absorb energy. Accordingly when the pin 31 strikes the abutment 34 the rotation of the disc and hence the pivoting of the vizor towards its closed position, is temporarily halted. As the pinion 26, is however, still rotating, the spring 28 is compressed and absorbs energy until there is sufficient power to rotate the disc 25 to cause the pin 31 to ride up the abutment, the pin 31 being forced inwardly against the action of its spring 32 and thereafter the closing of the vizor will be rapidly effected.

The halt in operation will be for a very brief period but the effect will be that the vizor will be given an initial rapid closing movement, which would be noted by the airman, who would be able to withdraw his head into the helmet during the pause period before the final rapid closing movement is effected. It will be noted that the energy stored in the spring over and above that required to overcome the abutment 34 will be released as the abutment is passed, to augment the power already available for effecting the final closing movement.

The pause may be of one or more seconds duration and can be varied by varying the compression of the spring 32 acting on the pin 31 or by regulating the flow of fluid pressure, for example by providing an adjustable needle valve so as to restrict or increase the flow and thereby determine the time required to build up pressure acting on the piston 5' to produce the power for rotating the pinion 26 to effect the compression of the spring 28.

According to the modification illustrated in FIGS. 10–12 the rack and pinion of the second embodiment are replaced by a crank mechanism. As shown a cylinder 4, which is connected to the fluid pressure supply by a pipe, 7, houses a piston 5", which is connected by a link 35 to a crank disc 36 freely rotatable on the hinge pin 6". The crank disc is formed with a circumferential slot 37 housing a spring 28' one end of which abuts a stud 38 projecting from a driving disc 39 which is keyed to the hinge pin 6" so that the discs 36 and 39 are resiliently coupled.

A member 40 is keyed to the hinge pin 6" and has a radial pin 41 urged radially outwards by a spring such that when the apparatus is in the "at rest" position the pin 41 is resiliently urged by its spring into a notch 42. An abutment 34a is provided disposed in the path of the pin 41.

The supply of fluid pressure is controlled by a pressure responsive device and valve unit A as previously described and when the frangible diaphragm is ruptured, fluid under presure flows through pipe 7 into the cylinder 4" to displace the piston 5" downwardly. During the first part of this movement the crank disc 36 is rotated and the spring 28' compressed until sufficient energy is stored up to rotate the driving disc 39 so as to cause the pin 41 to ride up the sloping face of the notch 42, by causing the pin 41 to move inwardly against the action of its spring.

When the pin rides over the top of the notch the driving disc is free to be rotated until the pin strikes the abutment 34a, when there will be a short pause while energy is built up to force the pin 41 to ride over. When the pin rides over the abutment the driving disc is rapidly rotated by the pressure acting on the piston 5" and the residual energy stored in the spring 28' to effect the rapid final closing movement of the vizor.

During this final movement the lower end 5a of the piston skirt will engage the priving disc 36 and provide a positive drive from the piston.

The springs 28 and 28' and the springs acting on the pins, 31, 41 are preferably arranged so that they are fully compressed when the pin reaches the high point of the cam shaped abutments and accordingly the energy stored in these springs is immediately effective to assist the continued rotation of the drive disc immediately this high point has been past.

It will be understood that if necessary the vizor can be closed by hand by the airman pulling up the vizor frame and it will require little additional effort to force the pin to ride up and over the abutments.

The provision of the resilient coupling provided by the springs 28, 28' has the important advantage that it is not only the means for storing up energy but also serves as a shock absorber when the pins 31, 41 strikes the abutment 34, 34'.

While the invention has been described with particular reference to a vizor of an airman's helmet it may be used with any other apparatus, mechanism or device.

We claim:

1. Apparatus for automatically pivoting a hinged vizor of an airman's helmet into closed position on a predetermined fall in the pressure of the surrounding atmosphere, said apparatus comprising fluid pressure operated mechanism connected with the hinged vizor for effecting pivoting movement into closed position, a receptacle containing fluid under pressure for operating the mechanism, a frangible diaphragm seal for said receptacle, means supporting said diaphragm seal against rupture by the fluid under pressure in said receptacle, and a pressure responsive device operable on said predetermined fall in pressure to effect the release of said diaphragm seal supporting means to permit the fluid under pressure in the receptacle to burst the diaphragm and operate the said mechanism to close the vizor.

2. Apparatus as claimed in claim 1 wherein means is provided for controlling the operation of said operating mechanism to complete the closing of the vizor in two stages separated by a predetermined short interval of time.

3. Apparatus for automatically pivoting a hinged closure into closed position on a predetermined fall in the pressure of the surrounding atmosphere, said apparatus comprising fluid pressure operated mechanism connected with the closure for effecting pivoting movement into closed position, a receptacle containing fluid under pressure for operating said mechanism, a frangible diaphragm seal for said receptacle, means abutting said diaphragm to support it against rupture by the fluid under pressure in said receptacle, a pivoted lever having an operative position wherein it holds said means in abutting position, a latch holding said lever in operative position, and a pressure responsive device operable on said predetermined fall in pressure to release the latch so that the said means is movable out of diaphragm supporting position to permit said fluid under pressure in the receptacle to rupture the diaphragm and operate the said mechanism.

4. Apparatus for automatically pivoting a hinged closure into closed position on a predetermined fall in the pressure of the surrounding atmosphere, said apparatus comprising fluid pressure operated mechanism connected with the closure for effecting pivoting movement into closed position, a receptacle containing fluid under pressure for operating the mechanism, a frangible diaphragm seal for said receptacle, means abutting said diaphragm to support it against rupture by the fluid under pressure in said receptacle, a pivoted lever operative to hold said means in abutting position, and a pressure responsive device operable on said predetermined fall in pressure to render the lever ineffective to hold said means in abutting position and so permit the fluid under pressure in the receptacle to rupture the diaphragm and operate the said mechanism.

5. Apparatus as claimed in claim 1 wherein the pressure responsive device comprises a barometric capsule.

6. Apparatus for automatically pivoting a hinged closure into closed position on a predetermined fall in the pressure of the surrounding atmosphere, said apparatus comprising lever mechanism connected with said closure, a piston connected with said lever mechanism, a cylinder for said piston, a receptacle containing fluid under pressure, conduit means connecting said receptacle with said cylinder, a frangible seal isolating the fluid under pressure in said receptacle from said conduit, means supporting said seal against rupture by said fluid pressure, and a pressure responsive device operable on said predetermined fall in pressure, to render said supporting means ineffective to support said seal such that said fluid under pressure in said receptacle is operable to burst the seal and flow through said conduit to said cylinder to actuate the piston to operate the lever mechanism to pivot said closure into closed position.

7. Apparatus for automatically pivoting a hinged vizor of an airman's helmet into closed position on a predetermined fall in the pressure of the surrounding atmosphere, said apparatus comprising lever mechanism connected with said vizor, a piston operable by fluid pressure, link means connecting said piston to said lever mechanism, a receptacle containing fluid under pressure, conduit means connecting said receptacle with said piston, a frangible seal for said receptacle, means supporting said seal against rupture by the fluid pressure in said receptacle, a pressure responsive device operable on said predetermined fall in pressure to render said supporting means ineffective to support said seal and so permit the fluid pressure to burst the seal and flow from said receptacle to actuate the piston to operate the lever mechanism to pivot said vizor into closed position.

8. Apparatus as claimed in claim 7 wherein means is provided for controlling the pivoting of the vizor such that it is completed in two phases separated by a predetermined short interval of time.

9. Apparatus for automatically pivoting a vizor of an airman's helmet about a hinge pin into closed position on a predetermined fall in the pressure of the surrounding atmosphere, said apparatus comprising a pinion mounted on said hinge pin, a piston formed with a rack meshing with said pinion, a supply of fluid pressure for operating said piston, a frangible member isolating said supply from said piston, a device abutting said member to support it against rupture by the fluid under pressure, pressure responsive means operable on said predetermined fall in pressure to permit said device to be moved out of supporting position to allow the frangible member to be burst by the said fluid under pressure, and conduit means for conveying fluid flowing through said frangible member, when burst, to said piston to cause the said rack to rotate the said pinion and so pivot the vizor into closed position.

References Cited in the file of this patent

UNITED STATES PATENTS

| | | |
|---|---|---|
| 1,264,167 | Elvin et al. | Apr. 30, 1918 |
| 2,036,224 | Lincoln et al. | Apr. 7, 1936 |
| 2,122,923 | Yettner | July 5, 1938 |
| 2,839,755 | Steriss | June 24, 1958 |
| 2,871,849 | Chatham et al. | Feb. 3, 1959 |
| 2,918,060 | Lobelle | Dec. 22, 1959 |